United States Patent [19]

Schmidt

[11] Patent Number: 4,568,199
[45] Date of Patent: Feb. 4, 1986

[54] MICROWAVE PYROMETER

[75] Inventor: Thomas R. Schmidt, Houston, Tex.

[73] Assignee: Shell Oil Company, Houston, Tex.

[21] Appl. No.: 482,700

[22] Filed: Apr. 6, 1983

[51] Int. Cl.$^4$ ............................ G01J 5/46; H04B 17/00
[52] U.S. Cl. .................................. 374/122; 324/58 A;
455/344
[58] Field of Search ............... 374/122, 139, 129, 149;
324/58 A; 99/342; 376/247; 455/344

[56] References Cited

U.S. PATENT DOCUMENTS

| | | | |
|---|---|---|---|
| 2,151,928 | 3/1939 | Mead | 374/129 X |
| 3,115,781 | 12/1963 | Shearman | 374/139 |
| 3,247,714 | 4/1966 | Schwabe et al. | 374/139 |
| 3,256,431 | 6/1966 | Frazier | 374/139 |
| 3,446,074 | 5/1969 | Thomas | 374/122 |
| 3,693,011 | 9/1972 | De Vaux et al. | 374/122 X |
| 3,777,270 | 12/1973 | Hardy et al. | 374/122 |
| 4,004,219 | 1/1977 | Tiuri et al. | 374/122 |
| 4,106,340 | 8/1978 | Hamid | 374/122 X |
| 4,411,533 | 10/1983 | Loftus et al. | 374/139 |

FOREIGN PATENT DOCUMENTS

| | | | |
|---|---|---|---|
| 0946464 | 8/1956 | Fed. Rep. of Germany | 374/122 |
| 0094229 | 7/1981 | Japan | 374/122 |
| 0799726 | 1/1981 | U.S.S.R. | 374/122 |

OTHER PUBLICATIONS

"Temperature Measurement of Particulate Surfaces", Bach et al., J. Sci. Instruments (J. Phys. E) (G.B), vol. 3, No. 4, 4/1970 (Six (6) pages).
"Dictionary of Scientific and Technical Terms", Daniel N. Lapedes, McGraw-Hill, ©1974, (Microwave only page).
"Instruments for Advanced Reactors", 1971 Nuclear Science Sym. and Nuclear Power Sym., T. Roger Billeter, pp. 814–819.

Primary Examiner—Daniel M. Yasich

[57] ABSTRACT

A method of and apparatus for measuring the temperature of hot gases and/or particulate matter inside of a heated vessel is provided. The apparatus senses microwave energy emitted by the hot gases from the heated vessel, converts the sensed microwave energy into a signal indicative thereof, and measures the amplitude of the signal as an indication of the temperature of the gas inside of the heated vessel. The antenna of the apparatus may be located interior of the pressure wall of the vessel, and may also contain refractory material in it. Any refractory material between the antenna and the source of microwaves is transparent to microwave radiation. The heated vessel may also have a refractory wall, which may contain the waveguide and/or antenna.

20 Claims, 7 Drawing Figures

MICROWAVE PYROMETER

BACKGROUND OF THE INVENTION

This invention relates to a method of and apparatus for making temperature measurements inside of a heated vessel, such as furnaces, reactors, incinerators and the like.

Temperatures inside of industrial furnaces, are usually measured by optical or infrared pyrometers, since the temperatures often exceed the capabilities of thermocouples. These optical or infrared pyrometers are aimed at the point of interest through a peep sight or inspection door. In the case of coal gasification reactors, which operate under pressure, transparent windows can be used in place of the peep sight or inspection door. The harsh environment of the reactor makes it extremely difficult to keep these transparent windows clear over extended periods. Generally, prior art workers have periodically cleaned the windows by means of a purge or the like and have measured the temperature by means of an optical or infrared pyrometer aimed through one of the windows.

Therefore, it is an object of the present invention to provide a system that can measure the temperature inside various heated vessels, such as furnaces, reactors, incinerators and the like, and that overcomes the problems of the prior art, such as requiring an observation port and requiring purging of transparent windows.

SUMMARY OF THE INVENTION

In accordance with the present invention there is provided a method of measuring the temperature inside of a heated vessel comprising the steps of sensing microwave energy emitted from the vessel, converting the sensed microwave energy into a signal indicative thereof, and measuring the amplitude of the signal as an indication of the temperature inside of the vessel.

In addition, the present invention provides an apparatus for sensing the temperature inside of a heated vessel comprising means for sensing microwave energy emitted from the vessel and for generating a signal indicative thereof and means for measuring the amplitude of the signal.

The present invention employs a microwave antenna to sense the microwaves being emitted from a heated vessel. The signal from the antenna is provided to a microwave radiometer which measures the amplitude of the signal as an indication of the temperature inside the vessel. The present invention can take various embodiments depending upon the type of heated vessel with which it is to be implemented. If the vessel is a furnace, incinerator or the like which has an observation port, the antenna can be positioned proximate such opening and connected to the microwave radiometer by suitable means, such as a coaxial cable. The antenna can also be positioned proximate a wall of the vessel, if the refractory material is transparent to microwave energy. In the event that the vessel contains neither an observation port nor refractory material that is transparent to microwave energy, a body of material that is transparent to microwave energy can be installed in the vessel wall at a suitable location with the antenna being located proximate thereto. Generally, the body of material employed in such an installation would be a refractory material. In addition, a waveguide filled with refractory material that is transparent to microwave energy can be installed in the wall of the vessel. Preferably, the antenna is positioned in the body of refractory material installed in the vessel wall or the refractory material located inside the waveguide. If the present invention is utilized in a reactor, such as a coal gasification reactor which requires the pressures to be retained in the reactor, a pressure seal is positioned in the pressure wall of the reactor. The pressure seal has a connecting means, such as a wire, for connecting the antenna to the radiometer on the outside of the reactor. Generally, coaxial cable is connected to the pressure seal and the radiometer for transmitting the microwaves.

Other objectives, advantages and applications of the present invention will be made apparent by the following detailed description of the preferred embodiments of the present invention.

DETAILED DESCRIPTION OF THE PREFERRED EMBODIMENTS

Figure 1:
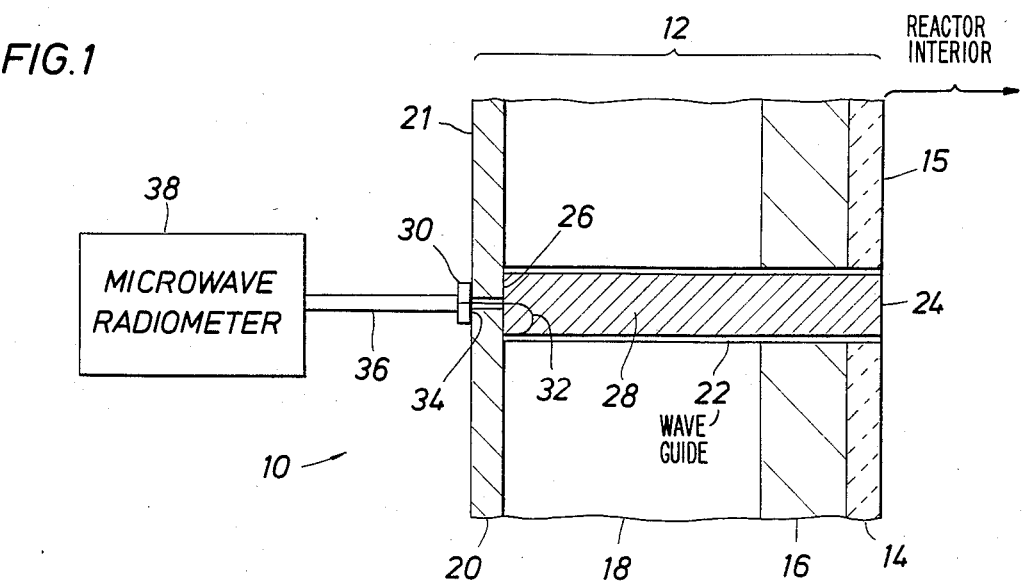
FIG. 1 is a partial diagrammatic view in side elevation of one embodiment of the temperature sensing system of the present invention which is suitable for use in a pressurized reactor.

Referring to FIG. 1, the temperature measuring system of the present invention, which is indicated generally by numeral 10, is incorporated in a pressurized reactor, such as a coal gasification reactor. Wall 12 of the reactor consists of a refractory lining 14, water tube wall 16, air space 18 and pressure wall 20, Surface 15 of refractory lining 14 is exposed to the inside of the reactor (not shown), and surface 21 of pressure wall 20 is the outside surface of wall 12. Waveguide 22 is positioned in wall 12 such that end 24 of waveguide 22 is exposed to the inside of the reactor and end 26 abuts pressure wall 20. Waveguide 22 is filled with refractory material 28 which is transparent to microwaves and can be, for example, aluminum oxide. A pressure seal 30 such as the hermetic pressure seal manufactured by Hermetic Seal Corporation, Rosemead, Calif., is positioned in pressure wall 20. An antenna, such as coupling loop 32, is positioned in refractory material 28 to sense the microwaves passing through waveguide 22. End 34 of coupling loop 32 is passed through an aperture in pressure seal 30 and is connected by appropriate means to one end of coaxial cable 36. The other end of coaxial cable 36 is connected to microwave radiometer 38.

The operating of the temperature sensing system of the present invention can be described as follows. Microwaves which are indicative of the temperature inside of the reactor enter end 24 of waveguide 22 and pass through refractory material 28 to coupling loop 32 which senses the microwave energy and provides it to microwave radiometer 38 by means of coaxial cable 36. Microwave radiometer 38 measures the microwave energy and provides an indication of the temperature of the reactor. If desired, temperature measuring system 10 can be used for continuous monitoring of the temperature in the reactor.

Figure 2:
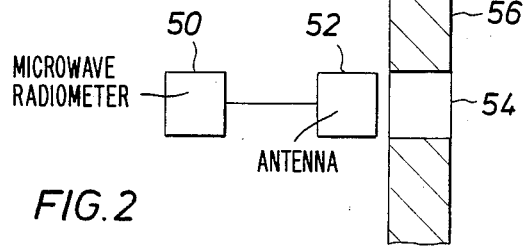
FIG. 2 is a diagrammatic view of one embodiment of the temperature sensing system of the present invention which is suitable for use with a heated vessel having an observation port.
Figure 3:
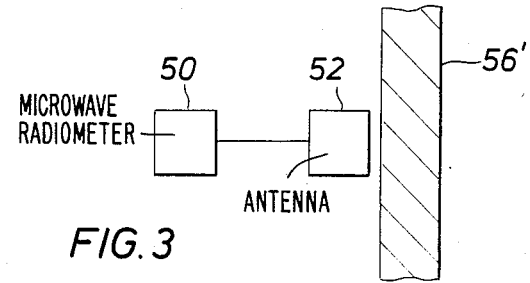
FIG. 3 is a diagrammatic view of one embodiment of the temperature sensing system of the present invention which is suitable for use with a heated vessel having a refractory material that is transparent to microwave energy.
Figure 4:
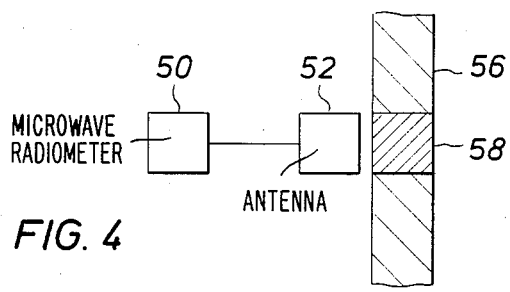
FIG. 4 is a diagrammatic view of one embodiment of the temperature sensing system of the present invention which is suitable for use with a heated vessel that has refractory material that is not transparent to microwaves.
Figure 5:
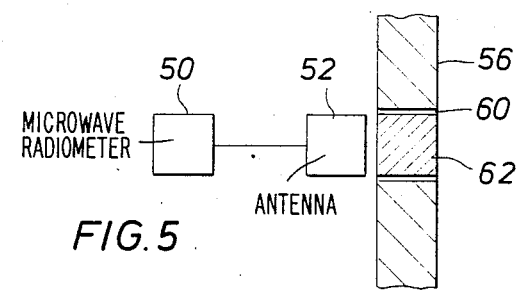
FIG. 5 is a diagrammatic view of an alternative embodiment of the temperature sensing system of the present invention shown in FIG. 4 which incorporates a waveguide mounted in the wall of the heated vessel.
Figure 6:
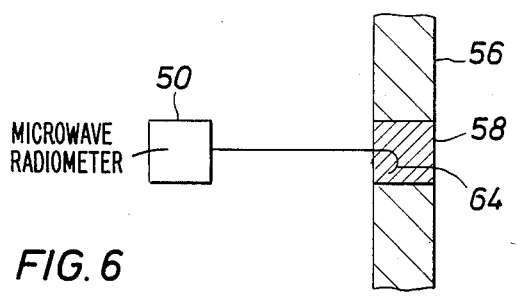
FIG. 6 is a diagrammatic view of an alternative embodiment of the temperature sensing system shown in FIG. 4.
Figure 7:
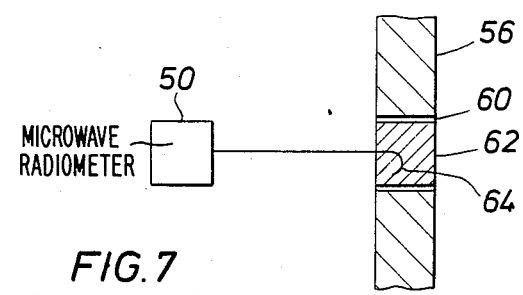
FIG. 7 is a diagrammatic view of an alternative embodiment of the temperature sensing system shown in FIG. 5.

FIGS. 2–7 show various embodiments of the temperature measuring system of the present invention. In FIG. 2 antenna 52 which is connected to microwave radiometer 50 is positioned proximate an opening 54 in wall 56 of the heated vessel to sense the microwave energy emitted through opening 54. FIG. 3 discloses an embodiment in which antenna 52 is positioned proximate a solid portion of wall 56'. In this embodiment, wall 56' must be made of a material that is transparent to microwave energy so that antenna 52 can sense the microwave energy transmitted through wall 56'. FIG. 4 illustrates an embodiment in which a body of material 58 that is transparent to microwave energy, such as suitable refractory material, has been installed in wall 56 of the heated vessel. Antenna 52 senses the microwave energy that passes through body of material 58. The embodiment shown in FIG. 5 incorporates a waveguide 60 mounted in wall 56 of the heated vessel. Waveguide 60 is filled with a suitable refractory material 62 that is transparent to microwave energy. The microwave energy that passes through refractory material 62 is sensed by antenna 52. FIG. 6 illustrates an alternative embodiment of the system shown in FIG. 4 in which antenna 64 is positioned in body of material 58. Similarly, FIG. 7 illustrates an alternative embodiment of the system shown in FIG. 5 in which antenna 66 is mounted in refractory material 62.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of measuring the temperature of a hot gas and particulate matter inside of a heated vessel, said method comprising the steps of:
sensing by an antenna adjacent an aperture in a wall of said vessel the microwave energy emitted from a portion of said gas and matter adjacent said aperture in the interior of said heated vessel;
converting the sensed microwave energy into an electrical signal indicative thereof;
and measuring the amplitude of said signal as an indication of the temperature inside of said heated vessel.

2. A method as recited in claim 1, further comprising the step of installing a body of material that is transparent to microwave energy at a predetermined location in a wall of said heated vessel such that microwave energy in said heated vessel can be transmitted therethrough and, wherein said sensing step comprises sensing the microwave energy that is emitted from said heated vessel through said body of material.

3. A method as recited in claim 1, further comprising the step of guiding microwave energy from inside of said heated vessel through a wall of said heated vessel and wherein said sensing step comprises sensing the microwave energy that is guided through said wall.

4. An apparatus for sensing the temperature of a hot gas and particulate matter inside of a heated vessel, said apparatus comprising: means for sensing by an antenna through an aperture in a wall of said vessel the microwave energy emitted from one portion of said hot gas and matter in said heated vessel adjacent said aperture and for generating an electrical signal indicative thereof; and means for measuring the amplitude of said signal.

5. An apparatus as recited in claim 4, further comprising a body of material, which is transparent to microwave energy, positioned in a wall of said heated vessel such that the microwave energy emitted in said heated vessel can be transmitted therethrough, said sensing and signal generating means being positioned to sense the microwave energy that is transmitted through said body of material.

6. An apparatus as recited in claim 5, wherein said sensing and signal generating means comprises the antenna.

7. An apparatus as recited in claim 6, wherein at least a portion of said antenna is positioned in said body of material.

8. An apparatus as recited in claim 7, wherein said body of material comprises refractory material.

9. An apparatus as recited in claim 6, wherein said body of material comprises refractory material.

10. An apparatus as recited in claim 6, wherein said measuring means comprises a microwave radiometer.

11. An apparatus as recited in claim 4, wherein said sensing and signal generating means comprises the antenna and said measuring means comprises a microwave radiometer.

12. An apparatus as recited in claim 4, further comprising a waveguide containing a body of material, which is transparent to microwave energy, positioned in a wall of said heated vessel such that microwave energy emitted in said heated vessel can pass through said waveguide, and wherein said sensing and signal generating means is positioned to sense the microwave energy that is transmitted through said waveguide.

13. An apparatus as recited in claim 12, wherein said body of material comprises refractory material.

14. An apparatus as recited in claim 12, wherein said sensing and signal generating means comprises the antenna.

15. An apparatus as recited in claim 14, wherein said measuring means comprises a microwave radiometer.

16. An apparatus as recited in claim 14, wherein at least a portion of said antenna is positioned in said body of material.

17. An apparatus as recited in claim 16, wherein said body of material comprises refractory material.

18. An apparatus as recited in claim 17, wherein said heated vessel has a pressure retaining wall and said apparatus further comprises a pressure seal positioned in said pressure wall, said antenna being connected to said measuring means through said pressure seal.

19. An apparatus as recited in claim 18, wherein said measuring means comprises a microwave radiometer.

20. An apparatus as recited in claim 19, wherein said antenna comprises a coupling hoop.

* * * * *